United States Patent
Srinivas et al.

(10) Patent No.: US 9,927,178 B1
(45) Date of Patent: Mar. 27, 2018

(54) COOLING PROCESS AND SYSTEM FOR DRY COOLING POWER PLANTS

(71) Applicant: TDA Research, Inc., Wheat Ridge, CO (US)

(72) Inventors: Girish Srinivas, Broomfield, CO (US); Steven Charles Gebhard, Golden, CO (US); Robert James Copeland, Metairie, LA (US); David P. Eisenberg, Denver, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 92 days.

(21) Appl. No.: 15/149,152

(22) Filed: May 8, 2016

Related U.S. Application Data

(60) Provisional application No. 62/159,046, filed on May 8, 2015.

(51) Int. Cl.
| | |
|---|---|
| *F28C 1/04* | (2006.01) |
| *F02C 6/18* | (2006.01) |
| *F01K 9/00* | (2006.01) |

(52) U.S. Cl.
CPC ............ *F28C 1/04* (2013.01); *F01K 9/003* (2013.01); *F02C 6/18* (2013.01); *F05D 2220/31* (2013.01);
(Continued)

(58) Field of Classification Search
CPC ......... Y02E 20/16; F01K 23/10; F01K 9/003; F02C 6/18; F01D 25/32
See application file for complete search history.

(56) References Cited

U.S. PATENT DOCUMENTS

| | | | | |
|---|---|---|---|---|
| 4,951,460 A | * | 8/1990 | Prochaska | F02C 7/04 60/39.511 |
| 7,194,869 B2 | * | 3/2007 | McQuiggan | F01D 25/32 261/88 |
| 7,343,746 B2 | * | 3/2008 | Pierson | F01K 23/10 60/728 |

OTHER PUBLICATIONS

Aquahabitat (2015): Spring Creek Aquatic Concepts http://www.aquahabitat.com/techfaqs.html#lake%20construction%20cost.
(Continued)

*Primary Examiner* — Pascal M Bui Pho
*Assistant Examiner* — Stefan Ibroni
(74) *Attorney, Agent, or Firm* — Brian J. Elliott

(57) ABSTRACT

A seasonal process that captures stores and uses water in an ambient temperature-dependent manner to improve the efficiency of a natural gas power plant, comprising: (a) providing a natural gas power plant, the natural gas power plant having a flue gas stream, a cooling tower, and a gas turbine; (b) providing a water collection system; (c) providing a water storage facility; wherein the flue gas stream comprises uncondensed water vapor; wherein the water collection system is operably connected to the flue gas stream and the flue gas stream is directed to flow, at least in part, into the water collection system; wherein the water collection system is operably connected to the water storage facility; wherein the water storage facility is operably connected to the cooling tower and the water storage facility is operably connected to the gas turbine; wherein the process comprises the following steps of condensing flue gas water or using water that has been condensed from the flue gas stream based on outdoor ambient dry bulb temperature: (I) Only condensing water from the flue gas stream to produce a condensed water stream if outdoor ambient dry bulb temperature is less than 85° F.; (II) Only using condensed water
(Continued)

Process overview to spray cool the cooling tower if outdoor ambient dry bulb temperature is at least 85° F.; (III) Only using condensed water to fog cool the gas turbine if outdoor ambient dry bulb temperature is at least 55° F.; wherein condensed water that is not immediately used to cool the cooling tower or to fog cool the gas turbine is stored in the water storage facility; and wherein the process uses a total amount of water on an annual basis to cool the cooling tower and to fog cool the gas turbine that does not exceed the annual amount of water condensed from the flue gas stream. Optionally, the process has a cooling tower that is a dry cooling tower and condensed water is used to spray cool the dry cooling tower, or the cooling tower is a wet cooling tower, or the cooling tower is a hybrid wet-dry cooling tower. The process may further comprise a water collection system having a three stage desiccant cycle and a calcium chloride desiccant that recovers at least about 60 wt % of the water from the flue gas, operates at or above ambient pressure or comprises plastic piping or plastic vessels. Or the process may further comprise using a water collection system having at least one direct contact condensing column that recovers at least about 60 wt % of the water from the flue gas, operates at or above ambient pressure or comprises plastic piping or plastic vessels. Or the process may further comprise using a water collection system having at least one direct contact condenser and a rotating wheel heat exchanger that recovers at least about 60 wt % of the water from the flue gas, operates at or above ambient pressure, or further comprises plastic piping or plastic vessels. The coefficient of performance for the cooling process is optionally at least 2.0.

16 Claims, 22 Drawing Sheets

(52) U.S. Cl.
CPC .... *F05D 2220/32* (2013.01); *F05D 2260/213* (2013.01)

(56) References Cited

OTHER PUBLICATIONS

Brooks, Frank J. (2010) "GE Gas Turbine Performance Characteristics" GE Power Systems Schenectady, NY GER-3578J, October.

Babakhani, D. "An analytical solution for air dehumidification by liquid desiccant in a packed column"Internat. Comm. in Heat and Mass Transfer 36 (2009) 969-977.
Copen, John, H et al. (2005): "Principles of Flue Gas Water Recovery System" POWER-GEN International 2005—Las Vegas, Nevada Dec. 6-8.
DOE (2010): Cost and Performance Baseline for Fossile Energy Plants vol. 1: Bituminous Coal and Natural Gas to Electricity, DOE/NETL-2010/1397, November.
EIA (2014): Annual Energy Outlook 2014, available online at http://www.eia.gov/forecasts/aeo/electricity_generation.cfm.
Folkedahl, B.C. et al. (2006): Water Extraction from Coal-Fired Power Plant Flue Gas, Energy & Environmental Research Center Final Report: 2006-EERC-15-05 (December).
Folkedahl, B. (2009) "Water Extraction from Fossil Fuel-Fired Power Plant Flue Gas," presented at ACC Users Group Workshop, Las Vegas, NV. Nov. 12-13, 2009.
Feely, Tom (2001): Wet Versus Dry Cooling Towers, Cooling Technology Institute (CTI) Education Seminar, Feb. 28: http://www.cti.og/downloads/CTI-2001-EduacationalSeminar.pdf.
Ganguly, A.R.; Ganguli, P. and Kuman, D. (2014) "Water Stress on U.S. Power Production at Decadal Time Horizons" presentation to ARPA-e, Jun. 2014.
GEA Heat Exchangers "Direct Air Cooled Condensing vs. Indirect Air Cooled Condensing Comparison Studies" Presented to the ACC User Group (2013).
Kays, W.M., London, A.L. (1984) "Compact Heat Exchangers" 3rd Edition, McGraw-Hill Book Company, New York, NY.
Levy, E. , Harun Bilirgen and John DuPont: (2011): Recovery of Water From Boiler Flue Gas Using Condensing Heat Exchangers Final Technical Report, DE NT0005648.
Maulbetsch, J. "Inlet Air Spray Cooling Enhancement for Air-Cooled Condensers" Energy Research & Develop. Div., Final Project Report. Prepared for California Energy Commision.
Sijbesma H., Nymeijer K., van Marwijk R., Heijboer R. and Wessling M. (2008). "Flue gas dehydration using polymer membranes" Journal of Membrane Science 313, 263-27.
Tokarz, R.D. et al. (1978): Comparative Cost Study of Four Wet/Dry Cooling Concepts That Use Ammonia as the Intermediate Heat Exchange Fluid, PNL-2661, September.
Ulrich, Gael D. (1984). "A Guide to Chemical Engineering Process Design and Economics" John Wiley and Sons, New York, NY.

* cited by examiner

| Item | Case 13 kWe | NGCC with Wet Cooling | | NGCC with Dry Cooling | | TDA in Phoenix AZ | |
|---|---|---|---|---|---|---|---|
| | | Summer Peak | Winter | Summer Peak | Winter | Summer Peak | Winter |
| Gas T | 362200 | 311,492 | 353,550 | 311,492 | 353,550 | 358,733 | 360,398 |
| Steam | 202500 | 200,713 | 202,500 | 176,771 | 200,713 | 197,735 | 200,713 |
| Total | 564700 | 512,205 | 554,263 | 488,263 | 554,263 | 556,468 | 561,111 |
| Aux Loads | 9,620 | 9,620 | 9,620 | 9,886 | 9,886 | 9,620 | 9,620 |
| TDA Desiccant | 59oF | Phoenix | | Phoenix | | 266 | 8,553 |
| Net kWe | 555,080 | 502,585 | 544,643 | 478,377 | 544,377 | 546,582 | 542,939 |

Fig. 1

|  | Summer Peak | Winter |
|---|---|---|
| Pump for ACC spray | 130 |  |
| Pump for fog sprayer | 136 | 136 |
| Air Blower for TDA Desiccant system |  | 6,561 |
| Water pump for condenser |  | 1,744 |
| Solution pump for absorber, regenerator + Cooling tower |  | 111 |
| Total Desiccant cycle kWe | 266 | 8,553 |

| Dry Bulb | Jan | Feb | March | April | Nov | Dec | Avg. Winter |
|---|---|---|---|---|---|---|---|
| Max | 68 | 71 | 75 | 84 | 75 | 68 | 73.5 |
| Min | 45 | 48 | 52 | 58 | 50 | 44 | 49.5 |
| Average | 55 | 60 | 65 | 70 | 63 | 55 | 61.3 |
| Dew Point | 29 | 33 | 37 | 41 | 35 | 29 | 34.0 |
| Dry Bulb | May | June | July | Aug | Sept | Oct | Avg. Summer |
| Max | 93 | 103 | 107 | 105 | 98 | 88 | 99 |
| Min | 68 | 75 | 83 | 82 | 74 | 63 | 74.2 |
| Average | 81 | 90 | 92 | 91 | 88 | 74 | 86 |
| Dew point | 35 | 41 | 58 | 58 | 52 | 35 | 46 |

Fig. 12

| Item | Case 13 kWe | NGCC with Wet Cooling | | NGCC with Dry Cooling | | TDA in Phoenix AZ | |
|---|---|---|---|---|---|---|---|
| | | Summer Peak | Winter | Summer Peak | Winter | Summer Peak | Winter |
| Gas T | 362,200 | 311,492 | 353,550 | 311,492 | 353,550 | 358,733 | 360,398 |
| Steam | 202,500 | 200,713 | 202,500 | 176,771 | 200,713 | 197,735 | 200,713 |
| Total | 564,700 | 512,205 | 554,263 | 488,263 | 554,263 | 556,468 | 561,111 |
| Aux Loads | 9,620 | 9,620 | 9,620 | 9,886 | 9,886 | 9,620 | 9,620 |
| TDA Desiccant | 59oF | Phoenix | | Phoenix | | 266 | 8,553 |
| Net kWe | 555,080 | 502,585 | 544,643 | 478,377 | 544,377 | 546,582 | 542,939 |

Fig. 13

| Item | TDA Desiccant | Condense Only | Wheel Cycle | Main Plant Dry Cooling |
|---|---|---|---|---|
| Dry Cooling for TDA | $ 11,969,950 | $ 4,703,213 | $ 4,103,092 | $ 52,207,999 |
| Towers + Packing | $ 8,707,551 | $ 2,902,517 | $ 2,902,517 | |
| Heat Exchangers | $ - | $ 5,604,707 | $ 4,033,690 | |
| Lake and Equipment | $ 1,289,800 | $ 1,289,800 | $ 1,289,800 | |
| Water pumps & Other | $ 55,000 | $ 35,000 | $ 35,000 | |
| Fans/blowers | $ 1,624,354 | $ 758,032 | $ 1,082,903 | |
| Subtotal | $ 23,646,655 | $ 15,293,269 | $ 13,447,002 | |
| Capital Charge Factor | 12.43% | 12.43% | 12.43% | $/$/y |
| O&M @ 1% | $ 236,467 | $ 152,933 | $ 134,470 | $/year |
| Capital Cost | $ 2,939,279 | $ 1,900,953 | $ 1,671,462 | $/year |
| Annual Cost | $ 3,175,746 | $ 2,053,886 | $ 1,805,932 | $/year |
| Water Collected | 1.09E+09 | 9.53E+08 | 1.09E+09 | lbs/year |
| Water Collected | 130,695 | 114,269 | 130,695 | Kgal/year |
| Cost of Water | $ 24.30 | $ 17.97 | $ 13.82 | $/kgal |

Fig. 17

| Condenser | | Heller Heat Exchanger | |
|---|---|---|---|
| $\dot{m}_{steam}$ = | 142.72 kg/s | $\dot{m}_{air}$ = | 22785.95 kg/s |
| $T_{steam\,condenser}$ = | 311.54 K | $T_{air\,in}$ = | 14.85 C |
| $T_{steam\,condenser}$ = | 38.39 C | $T_{air\,out}$ = | 28.81 C |
| $P_{steam\,Condense}$ = | 6624 Pa | $P_{air\,in}$ = | 101325 Pa |
| | | $P_{air\,out}$ = | 101265 Pa |
| $\dot{m}_{water}$ = | 14256 kg/s | | |
| $T_{water\,in}$ = | 302.15 K | $\dot{m}_{water}$ = | 14256 kg/s |
| $T_{water\,in}$ = | 29 C | $T_{water\,in}$ = | 34.39 C |
| $P_{water\,in}$ = | 341476 Pa | $P_{water\,in}$ = | 216457 Pa |
| $T_{water\,out}$ = | 307.54 K | $T_{water\,out}$ = | 29 C |
| $T_{water\,out}$ = | 34.39 C | $P_{water\,out}$ = | 201325 Pa |
| $P_{water\,out}$ = | 216457 Pa | | |
| | | | |
| LMTD = | 6.32 C | LMTD = | 9.21 C |
| Q = | 321.38 MW | Q = | 321.38 MW |
| A = | 13191 m^2 | A = | 155710 m^2 |
| U = | 3857.08 W/m^2-C | U = | 224.07 W/m^2-C |
| Cost | $28,319,135 | Cost $ | 23,888,864 |

Fig. 18

Desiccant Cooling Tower

| | |
|---|---|
| $\dot{m}_{water}$ = | 2,805.88 kg/s |
| $T_{water\,in}$ = | 42.00 C |
| $T_{water\,out}$ = | 30 C |
| Cp water = | 4182 J/kg-C |
| Q = | 140.810 MW |
| | |
| $\dot{m}_{air}$ = | 8,970 kg/s |
| Cp air = | 1005 J/kg-C |
| $T_{air\,in}$ = | 20 C |
| $T_{air\,out}$ = | 35.62 C |
| LMTD = | 8.1 C |
| A = | 78021 m^2 |
| cost = | $ 11,969,950 |

Condenser Only Cooling Tower

| | |
|---|---|
| $\dot{m}_{water}$ = | 1672.38 kg/s |
| $T_{water\,in}$ = | 4182 J/kg-C |
| $T_{water\,out}$ = | 38.5 C |
| Cp water = | 30 C |
| Q = | 59.448 MW |
| | |
| $\dot{m}_{air,scaled}$ = | 2673.04 kg/s |
| $\dot{m}_{air,doubled}$ = | 5346.07 kg/s |
| Cp air = | 1005 J/kg-C |
| $T_{air\,in}$ = | 20 C |
| $T_{air\,out}$ = | 31.06 C |
| LMTD = | 8.654 C |
| A = | 30656 m^2 |
| Cost = | $ 4,703,213 |

Wheel Cooling Tower

| | |
|---|---|
| $\dot{m}_{water}$ = | 1393.65 kg/s |
| $T_{water\,in}$ = | 4182 J/kg-C |
| $T_{water\,out}$ = | 38.84 C |
| Cp water = | 30 C |
| Q = | 51.522 MW |
| | |
| $\dot{m}_{air,scaled}$ = | 2227.53 kg/s |
| $\dot{m}_{air,doubled}$ = | 4455.06 kg/s |
| Cp air = | 1005 J/kg-C |
| $T_{air\,in}$ = | 20 C |
| $T_{air\,out}$ = | 31.51 C |
| LMTD = | 8.598 C |
| A = | 26744 m^2 |
| Cost = | $ 4,103,092 |

Fig. 19

COOLING PROCESS AND SYSTEM FOR DRY COOLING POWER PLANTS

CROSS-REFERENCE TO RELATED APPLICATIONS

This application claims the benefit of U.S. provisional application 62/159,046, filed May 8, 2015 which is incorporated by reference herein in its entirety.

STATEMENT REGARDING U.S. GOVERNMENT SUPPORT

This invention was made in part using U.S. government funding through the U.S. Department of Energy contract DE-AR000581. The government has certain rights in this invention.

BACKGROUND OF THE INVENTION

When using a steam cycle to generate electricity, there needs to be a way to reject heat in order to condense the steam after it has gone through the turbine. Traditionally, this is done in a wet cooling tower where the heat is rejected by evaporating water. Wet cooling towers are very effective because water is an efficient heat transfer medium and the latent heat of vaporization of water is very high (~970 Btu/lb). However, this still requires an enormous amount of water. In DOE's case 13 (an NGCC plant running at a constant 59° F.), the water consumption is listed as 1,831 gallons/minutes or almost a billion gallons per year (most of which is used in the wet cooling tower). In water stressed regions, this amount of water consumption may not be feasible. The alternative to wet cooling is dry cooling, often in the form of an air cooled condenser (ACC). In an ACC, air is used to condense the steam instead, and there is no net water usage.

The trouble with a dry cooling system is that its performance is worst (power production drops the most) in the summer during the times of highest consumer power demand when replacement power is most expensive. Dry cooling can be augmented by using some amount of water. For instance, water can be sprayed into an ACC, reducing the temperature of the air entering the ACC and increasing its performance (Maulbetsch 2007). Alternatively, a hybrid wet-dry cooling tower can be used. Here, the dry cooling tower handles most of the cooling load, throughout most of the year. However, when dry bulb temperature is hottest, and the dry tower is least effective, then the wet part takes over and handles most of the cooling load. However, both of these methods still consume some water, and in many places, due to a combination of permitting and water scarcity, a power plant may not be able to draw from any local water sources. A solution, is to recover the water of combustion, this water can then be used for augmented dry cooling while still maintaining zero net water consumption. Past studies have looked at recovering the water of combustion for cooling and they have used the water when it was generated, without storage.

Calcium chloride desiccant cycles have been proposed to recover water of combustion; for example the WETEX cycle (Folkedahl 2006 and 2009) that was developed for use with pulverized coal plants. Because it was designed for use with coal plants where there is no "free" hot, dry gas stream to drive the regeneration, the WETEX cycle used a combination of vacuum and regenerative heat exchange (recovery of the heat of adsorption) to drive the desiccant cycle. To withstand the vacuum forces, the entire system had to be made of metal, and to prevent corrosion metal components have to be made from stainless steel because the calcium chloride solution is so corrosive. As a result, the capital cost of the WETEX process was high.

Tokarz et al. (1978) reviewed previous dry and wet cooling tower systems. This study found that ammonia heat transport systems with either all wet or the deluge scheme for wet/dry cooling were potentially more cost-effective than the state-of-the-art power plant heat rejection systems. Levy et al. (2001) evaluated condensing heat exchanger technology for recovering moisture from flue gas from coal-fired power plants. The condensed water was used to replace some of the water that would otherwise be purchased for use in the wet cooling tower, and they found an economic benefit. Sijbesma et al. (2008) describe a membrane to separate steam from the flue gas. The steam (under vacuum) is then condensed by a dry cooling tower.

Copen et al. (2005) discussed a new technology that recovers the water vapor contained in power plant flue gas streams. Copen et al. (2005) analyzed a Liquid Desiccant Dehumidification System (LDDS or WETEX). A small storage unit allowed collection at night. Regeneration occurred under vacuum in a 316 SS flash drum, but the desiccant piping to the absorber, and to and from the flash drum (nominally at 1 psia and 100° F.) were made of SCH 80 chlorinated polyvinyl chloride (CPVC). Folkedahl (2006 and 2009) calculated the incremental cost of the Copen WETEX process with an air cooled condenser (ACC) to be $25.3 million greater than that of a wet cooling system. The water collected was less expensive than demineralized water ($0.05/gal). The process was studied for both coal fired power plants and for natural gas combined cycle (NGCC). For a 75 gpm WETEX system, the capital cost with a 500 MW NGCC was $8,771,000 and the cost per gal was 0.04$/gal, with water collection running 12 hours per day and 300 days per year.

The above prior art relating to power plants and generating electricity each suffer from at least one of the following limitations: the need to improve the overall efficiency of electric power generation, limited water in arid locations, the inability to get permitted to build new plants in arid climates that would require additional water for cooling due to water scarcity, high capital costs for vacuum-rated and corrosion-resistant parts used in exiting water collection processes.

SUMMARY OF THE INVENTION

The present invention solves the limitations of the prior art by providing a process that captures and uses water to improve the efficiency of a natural gas plant in a cost-effective manner that uses a system the operates at or near ambient pressure, allowing some components to be made from low-cost plastic materials. The process also solves problems related to the cost of recovering the water by using a seasonal (Year-long) capture and use method. Also, the process does not require any municipal water, ground water, or surface water, which is a serious limitation of prior art for power plant located in desert climates.

The present invention provides a seasonal process that captures stores and uses water in an ambient temperature-dependent manner to improve the efficiency of a natural gas power plant, the process comprises: (a) providing a natural gas power plant, the natural gas power plant having a flue gas stream, a cooling tower, and a gas turbine; (b) providing a water collection system; (c) providing a water storage facility; wherein the flue gas stream comprises uncondensed water vapor; wherein the water collection system is operably connected to the flue gas stream and the flue gas stream is directed to flow, at least in part, into the water collection system; wherein the water collection system is operably connected to the water storage facility; wherein the water storage facility is operably connected to the cooling tower and the water storage facility is operably connected to the gas turbine; wherein the process comprises the following steps of condensing flue gas water or using water that has been condensed from the flue gas stream based on outdoor ambient dry bulb temperature: (I) Only condensing water from the flue gas stream to produce a condensed water stream if outdoor ambient dry bulb temperature is less than 85° F.; (II) Only using condensed water to spray cool the cooling tower if outdoor ambient dry bulb temperature is at least 85° F.; (III) Only using condensed water to fog cool the gas turbine if outdoor ambient dry bulb temperature is at least 55° F.; wherein condensed water that is not immediately used to cool the cooling tower or to fog cool the gas turbine is stored in the water storage facility; and wherein the process uses a total amount of water on an annual basis to cool the cooling tower and to fog cool the gas turbine that does not exceed the annual amount of water condensed from the flue gas stream.

Optionally, the process has a cooling tower that is a dry cooling tower and condensed water is used to spray cool the dry cooling tower, or the cooling tower is a wet cooling tower, or the cooling tower is a hybrid wet-dry cooling tower.

In an optional embodiment, the process further comprising a water collection system having a three stage desiccant cycle and a calcium chloride desiccant that recovers at least about 60 wt % of the water from the flue gas, operates at or above ambient pressure or comprises plastic piping or plastic vessels.

In an optional embodiment, the process further comprises using a water collection system having at least one direct contact condensing column that recovers at least about 60 wt % of the water from the flue gas, operates at or above ambient pressure or comprises plastic piping or plastic vessels.

In an optional embodiment, the process further comprises using a water collection system having at least one direct contact condenser and a rotating wheel heat exchanger that recovers at least about 60 wt % of the water from the flue gas, operates at or above ambient pressure, or further comprises plastic piping or plastic vessels.

In an optional embodiment the coefficient of performance for the cooling process is at least 2.0.

BRIEF DESCRIPTION OF THE DRAWINGS

FIG. 1. A comparison of the TDA system desiccant based dry cooling and NGCC efficiency in Phoenix compared to the reference U.S. Department of Energy "Case 13" (a 59° F. site) and a conventional NGCC using Wet or Dry cooling in Phoenix. For the case of NGCC with wet cooling an unlimited supply of water is assumed.

FIG. 10. Power Requirements for TDA Novel Cooling System.

FIG. 11. Composition, Temperatures, Flow Rates, and Pressures of all state points.

FIG. 12. Phoenix, Ariz. monthly average temperatures.

FIG. 13. Summer Peak period and Winter average net Power.

FIG. 17. Cost estimate for TDA's water collection systems.

FIG. 18. Cost of full scale dry cooling tower from ARPA-E's TEA.

FIG. 19. Cost estimates for other cooling towers.

DETAILED DESCRIPTION OF THE INVENTION

In the specification and accompanying drawings of the invention the terms "TDA system" and "TDA's system" refer to particular embodiments of the invention that comprise hardware used as part of an overall power plant, or for a NGCC as an example. The present invention is a process that uses the "TDA system" in combination with other NGCC plant unit operations.

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

The abbreviation NGCC means natural gas combined cycle.

The term "COP" means coefficient of performance and is a common thermodynamic rating of cooling towers and processes using cooling towers. It is defined as the cooling effect divided by the work input.

The term "COE" means the cost of electricity per kWhr.

The term "plastic" means any suitable polymeric material for piping or vessels, non limiting examples including: polypropylene (PP), polyvinyl chloride (PVC), chlorinated polyvinyl chloride (CPVC), polycarbonate (PC), and the like.

Figure 2:
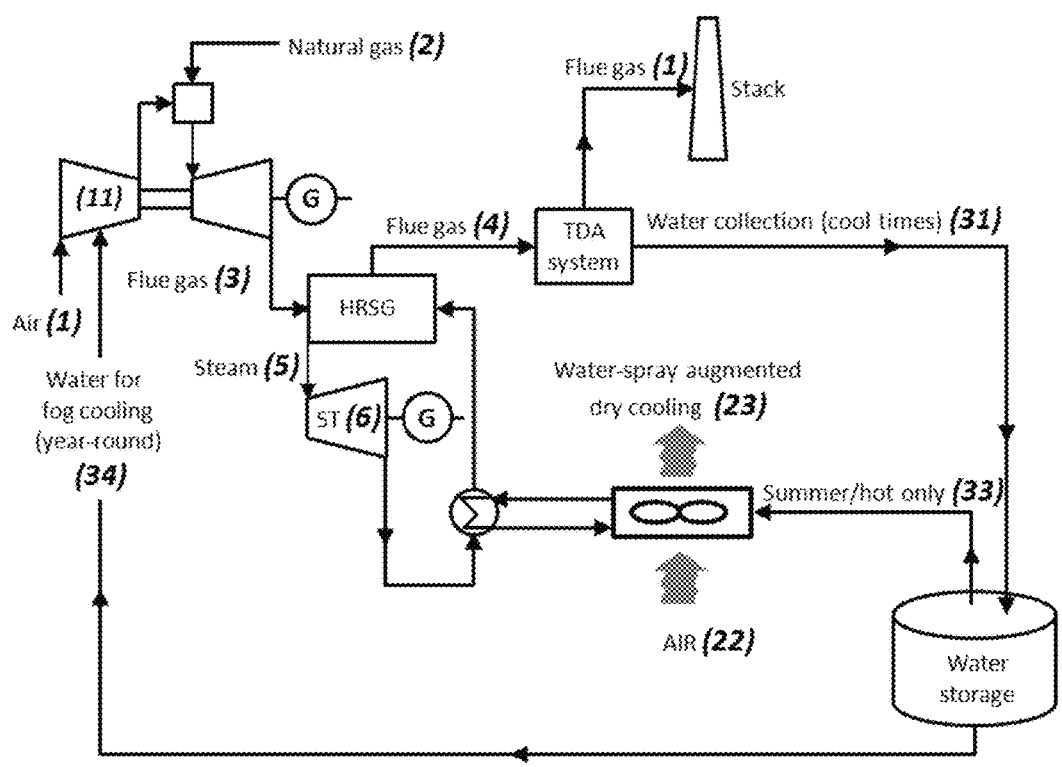
FIG. 2. Schematic of an NGCC plant using a TDA system for collecting water. Number labels represent gas or liquid flow streams.

The invention relates to a novel system that collects approximately 60% of the water of combustion in a Natural Gas Combined Cycle (NGCC) plant and uses the water to improve the efficiency by either dry cooling, wet cooling, hybrid wet/dry cooling, fog cooling the turbine, or combinations thereof. The system collects the water during cool periods (winter, spring, fall), stores it in a small lake (seasonal storage) and then uses it to augment the cooling during the peak periods of the hot summer months, increasing the output of a NGCC when it is most needed and valuable (FIG. 2).

The invention solves the limitations of the prior art by recovering much of the water of combustion during the cool months when it is easy to capture, storing it in a small lake, and then using the recovered water to provide additional (wet) cooling, especially in the summer when it is needed most and is most valuable. It is proposed to conduct water recovery using one of three alternative approaches: 1) cooling water is sprayed into a direct contact condensing column in counter flow to flue gas, 2) use the same direct contact condenser column, but add a rotating wheel heat exchanger for the exhaust from the condenser column to collect additional water, 3) remove the wheel heat exchanger and use a desiccant loop instead to collect additional water. All three of these systems work at ambient pressure, by eliminating the use of vacuum, the system uses plastic instead of stainless steel for the piping and vessels; solving a problem of the prior art (high capital costs). Further, because the system runs at moderate temperatures (40-106° C.) it has good driving forces for heat transfer inside the system, reducing the size of the vessels and the two remaining indirect contact heat exchangers. For the desiccant cycle specifically, because the exhaust flue gas from an NGCC is a hot, dry stream, it can be used to regenerate the desiccant without having to add additional power. Finally, because of a unique three stage cycle of the desiccant system, the effective cycle coefficient of performance (COP) is quite high (2.0). Cycle COP is the enthalpy of the water recovered in the direct contact condenser divided by the heat input to the regeneration.

The extra cooling from the recovered and stored water increases the power output of a plant with a dry cooling system. In an embodiment, the water is used on hot summer afternoons to minimize the amount of expensive peak power that must be purchased from another utility or generated with simple cycle combustion turbines. The extra power the present invention generates is very valuable (equal to the cost of the peak power it replaces). FIG. 2 shows how TDA's system fits into the overall NGCC process (TDA's system is represented by the box located downstream of the heat recovery steam generator (HRSG).

When coupled with a natural gas combined cycle (NGCC) the process may use a small amount of the water year-round, or periodically only when the ambient dry bulb temperature is at least 55° F., to fog cool the air entering the gas turbines. Fog cooling lowers the inlet temperature to the compressor, reducing the work of compression and increasing the net power output. Fog cooling may be beneficial even in the winter when the turbines are operating near their design output the extra power generated from fog cooling more than makes up for the parasitic power used to run our water recovery system. However, most of the benefit (in terms of both power produced and especially revenue generated/cost savings) comes on hot summer days when the gas turbine is greatly de-rated. For example, if a gas turbine that in the winter produces 353 MW without fog cooling and 360 MW with fog cooling (a 1.4% improvement). On a hot summer afternoon this same turbine would produce 311 MW without fog cooling and 358 MW with fog cooling (a 15% improvement). Further, the power produced in the summer is far more valuable than power produced in the winter. While the average annual cost of electricity (COE) of our reference gas turbine is $58.9/MWhr, power produced on a hot summer afternoon is worth $250-$500 MW (depending on the assumptions of Feely, 2001). Thus, it is useful to store the water produced in the winter for use in the summer when it is most valuable; storing water in a lake costs very little (on a per gallon basis), and only about 4% of the water stored in the lake is lost to evaporation.

In another embodiment, on hot summer days during peak hours, the process may also use water to reduce the back pressure of the cooling tower. This can be done in one of two optional ways, the first is that water is sprayed into the air entering the dry cooling towers, greatly improving their performance, lowering the steam turbine back-pressure and improving the efficiency of the steam cycle. The other method involves using a hybrid wet-dry cooling tower and using the collected water for the wet part of the hybrid tower, improving performance over an all dry tower, lowering the steam turbine back-pressure, and improving the efficiency of the steam cycle.

In an embodiment a lake is used to store condensed water. For a 550 MWe natural gas fired combined cycle (NGCC) located in Phoenix, where two thirds of the power is generated by the gas turbines and one third by the steam cycle, a lake needs to hold 83 million gallons of water. For this case a lake may be 688 feet in diameter and 30 feet deep.

The stored water collected may be used wherein: 1) water is injected year round into the inlet air of the gas turbine ("fog" cooling) to reduce the air inlet temperature (reducing compressor power and increasing the gas turbine output and efficiency); and 2) stored water is used to reduce the back pressure on the condensing towers (either by cooling the air entering the steam condensers, such as dry Air Cooled Condensers, or by using it in a hybrid wet-dry condenser) of the bottoming cycle during the summer. Spray cooling reduces the inlet air temperature to the ACC, lowering the steam turbine back pressure and increasing its power output and efficiency. Alternatively, a hybrid wet-dry cooling tower could be used to reduce the turbine back pressure and increase its power output and efficiency. Alternatively, water recovery, seasonal storage and spray cooling the ACC would improve the efficiency and reduce the cost of electricity from a coal fired power plant. Likewise, water recovery, seasonal storage and fog cooling can increase the performance of a stand-alone gas turbine plant, especially in the summer.

The present invention uses wet cooling of the turbine and ACC, however the water does not come from a local water source; instead it is produced during combustion and recovered from the flue gas. During cool periods the system may collect 60% of the water of combustion. Thus, the invention provides both a high-COP sorption/desorption cooling system (it generates more energy in the form of total enthalpy relative to the enthalpy required to operate the process) and it provides for a seasonal water storage with critical dry bulb temperatures directing when to operate which aspects of the process.

In an embodiment the desiccant cycle (for example see FIG. 3) may use the waste heat available in the NGCC exhaust (106° C.) to regenerate the desiccant (because the system collects more water than cycles through the desiccant, the effective COP is 2.0). The process may uses dry cooling in the desiccant cycle. Because it can regenerate with the hot, relatively dry flue gas, the entire cycle operates at atmospheric pressure (instead of vacuum as in other systems). Thus, it can use contactors made from plastic (instead of costly stainless steel). This greatly reduces capital cost; it is a high capital cost that has prevented the use of previous water recovery cycles.

In optional embodiments, either a condenser only (see FIG. 4) or a condenser with rotating wheel (see FIG. 5) may not collect as much water as the desiccant cycle, but they each have a much lower capital cost (mostly due to a smaller dry cooling tower and less volume of packed tower). Additionally, they remove the need for the desiccant entirely, simplifying process operation.

In one embodiment, using dry cooling increases the cost of energy (COE) per kWhr of an NGCC by 3.37% in Phoenix Ariz. (compared to wet cooling with low cost water). In contrast, with the present water recovery and seasonal storage the penalty for switching from wet to dry cooling is reduced to 2.64%.

The present invention may also be practiced with coal fired plants and stand-alone gas turbines.

Figure 4:
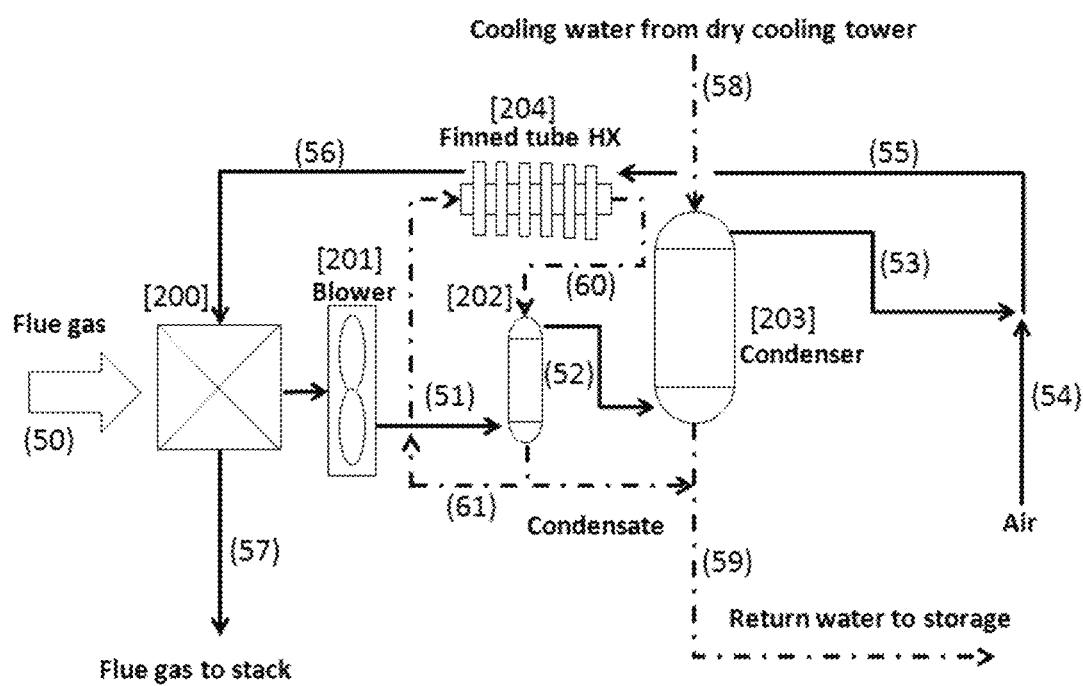
FIG. 4. Details of the condenser only water collection system.

An embodiment of the process and systems is that they capture about 60% of the flue gas water during the cooler months. FIG. 4 shows the condenser only design for condensing water from the flue gas stream. Hot flue gas (106° C., 8.67% by volume water vapor), stream (50), is first directed through a cross flow heat exchanger, component [200] which cools the flue gas stream to just above its saturation temperature, ~48° C. Then the flue gas, stream (51), enters a small direct contact condenser, component [202], where cool water, stream (60), is sprayed into the top. The water cools the flue gas further, condensing some of the water out of it, stream (61). The flue gas, stream (52), then continues onto a bigger direct contact condenser, component [203] where cool water is again sprayed into it, stream (58). This cools the gas further, condensing more water, stream (59), out of the flue gas. After exiting the condenser (30° C.), the flue gas, stream (53), is then mixed with ambient air (stream 54), to make stream (55) and blown over a finned tube heat exchanger, component [204]. This heat exchanger cools the cooling water, stream (61), used in the small direct contact condenser (instead of using a cooling tower to cool that water). This increases the flue gas temperature to approximately 39° C., stream (56). Then, it is directed toward the cross flow heat exchanger, where it acts as a heat sink for the incoming flue gas before being exhausted, stream (57).

In an embodiment all or part of the water which comes out of the main direct contact condensing column is sent to storage. A portion may be used in a dry cooling unit so that it can be recycled, and sprayed back into the top of the main direct contact condensing column. This setup could be designed more simply, by removing the supplemental direct contact column, component [202], the finned tube heat exchanger, component [204], and the cross flow heat exchanger, component [200]. However, in this case, all of the heat from the flue gas would have to be rejected by the water via the dry cooling unit. The use of those other components allows the dry cooling unit to be smaller. The savings by reducing the dry cooling unit is greater than the cost of the additional components, thus reducing the capital cost.

Figure 3:
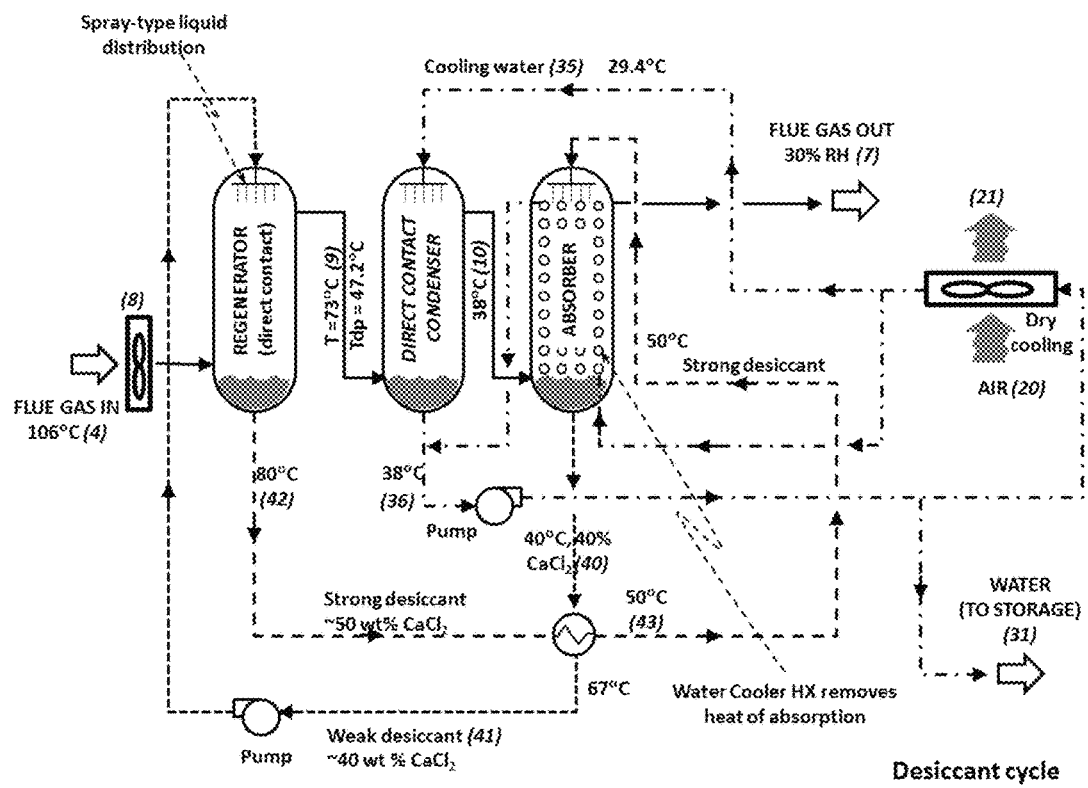
FIG. 3. Details of the desiccant water collection system.
Figure 5:
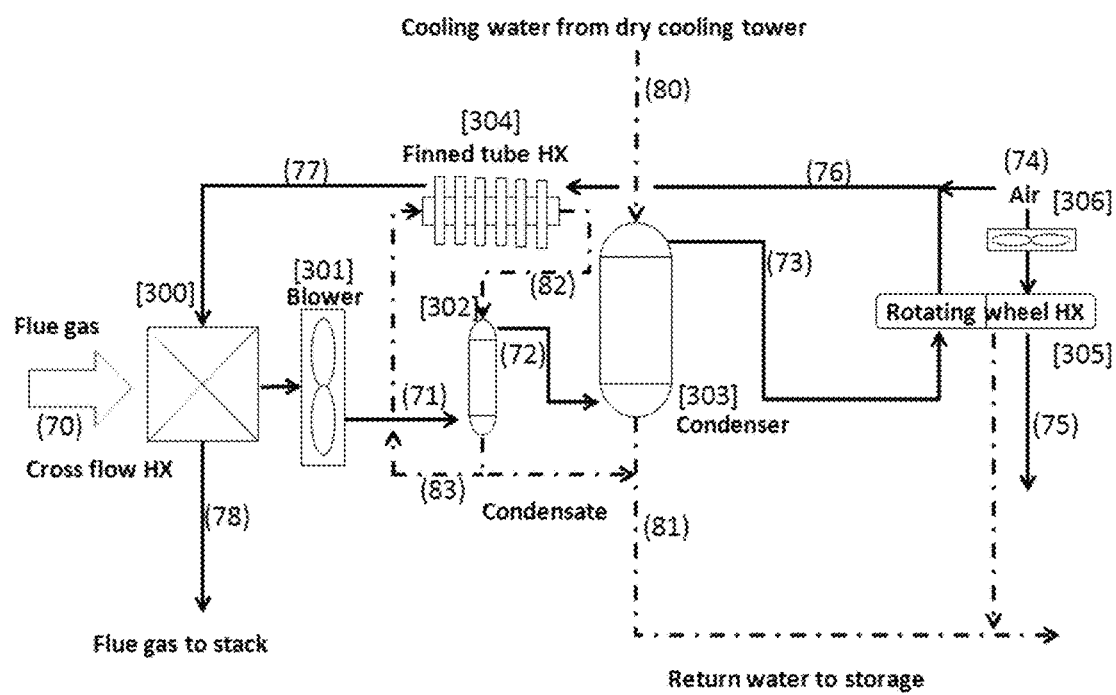
FIG. 5. Details of the rotating wheel water collection system.

FIG. 5 displays the wheel heat exchanger design. Most of the components are identical to the previous setup, (cross flow heat exchanger, fin tube heat exchanger, small condensing column, main condensing column). The main difference is the addition of a rotating wheel heat exchanger, component [305]. The rotating wheel heat exchanger (similar to a Ljungstom heat exchanger) is used to condense additional water from the flue gas exhaust, stream (73). The rotating wheel heat exchanger is filled with high specific surface area packing. On one side, cool, ambient air, streams (74), is blown over the packing, cooling it. On the other side, the warmer flue gas is blown over the packing, stream (73). The heat from the flue gas is rejected to the ambient air via the packing. This serves to condense additional water from the flue gas, stream (84). Furthermore, it cools the flue gas before it passes the finned tube heat exchanger, component [304], or the cross flow heat exchanger, component [300]. This allows both of those to be smaller, and thus reduces the capital cost associated with each. In an embodiment, an NGCC uses the desiccant cycle with a three stage water recovery (desiccant) cycle (FIG. 3). The desiccant regeneration (vessel [101] in FIG. 3) is driven by the hot (106° C.), relatively dry air, stream (4), from the gas turbine (after it has been partially cooled to drive the steam turbine); this air is hot enough to regenerate the solution, and because gas turbines run with excess air it is dry enough to pick up large quantities of water. In the system water absorbed in the third vessel [103] is carried in the weak (water laden) calcium chloride solution, stream (40), from the absorber back to the regenerator [101], where it is evaporated into the flue gas, cooling it (from 106 to 80° C.) and humidifying it. Next, the wet, cool flue gas, stream (9) goes to a direct contact condenser (the middle vessel [102]); where the water of combustion is recovered; this further cools the flue gas to 38° C. Finally the flue gas, stream (10), goes to the absorber [103], which draws the humidity in the flue gas down much lower than that which could be achieved in just the direct contact condenser. In the third stage (the absorber), the calcium chloride solutions picks up the water to recycle it back to the first stage and recover it in the second stage. Further, the direct contact condenser works better with the elevated water content created by the recycle stream. The net water removal is the difference between the amount of water entering with the flue gas, stream (4), and leaving the absorber in stream (7).

For all three variations of the TDA system (FIG. 3, FIG. 4, FIG. 5), some of the collected water goes to storage, but much of it may go immediately to a dry cooling unit and then be recycled to the direct contact condenser (in the case of the desiccant cycle, it is also used to cool the desiccant before entering the absorber). Ambient air (below 20° C.; 68° F.) cools the water and returns it to the direct contact condenser.

For the desiccant cycle, a recuperative heat exchanger (HX), component [107] preheats the weak $CaCl_2$ solution to ~60° C. and cools the strong solution to ~55° C. The dry cooling tower, component [104] cools the strong solution to ~38° C. before it enters the absorber. The flue gas exits to the stack with 30% relative humidity, stream (7). The absorption of water by the desiccant heats the solution to ~45° C.

Because it uses a hot dry stream to drive the regeneration the TDA system can run the entire process at ambient pressure. By eliminating the use of vacuum, the system can use plastic instead of stainless steel for the piping and vessels; solving the biggest problem of the prior art (high capital costs). Further, because the system runs at moderate temperatures (40-106° C.) it has good driving forces for heat transfer inside the system, reducing the size of the vessels and the two remaining indirect contact heat exchangers. Finally, for the desiccant cycle, because of a unique three stage cycle, the effective cycle COP is quite high (2.0). Cycle COP is the enthalpy of the water recovered in the direct contact condenser divided by the heat input to the regeneration. The COP is so high in part because we take credit for all the water that is condensed even though some of the total could be captured without the desiccant cycle. On an incremental basis (additional water recovered divided by heat input) the COP is still 1.12.

The lack of water for wet cooling in arid locations (e.g., Phoenix, Ariz.) makes dry cooling necessary. However, dry cooling reduces the efficiency of the steam cycle. The efficiency loss for the reference NGCC is 2.3% on going from a wet to a dry cooling system, but would be even worse (3.37%) in Phoenix.

Figure 14:
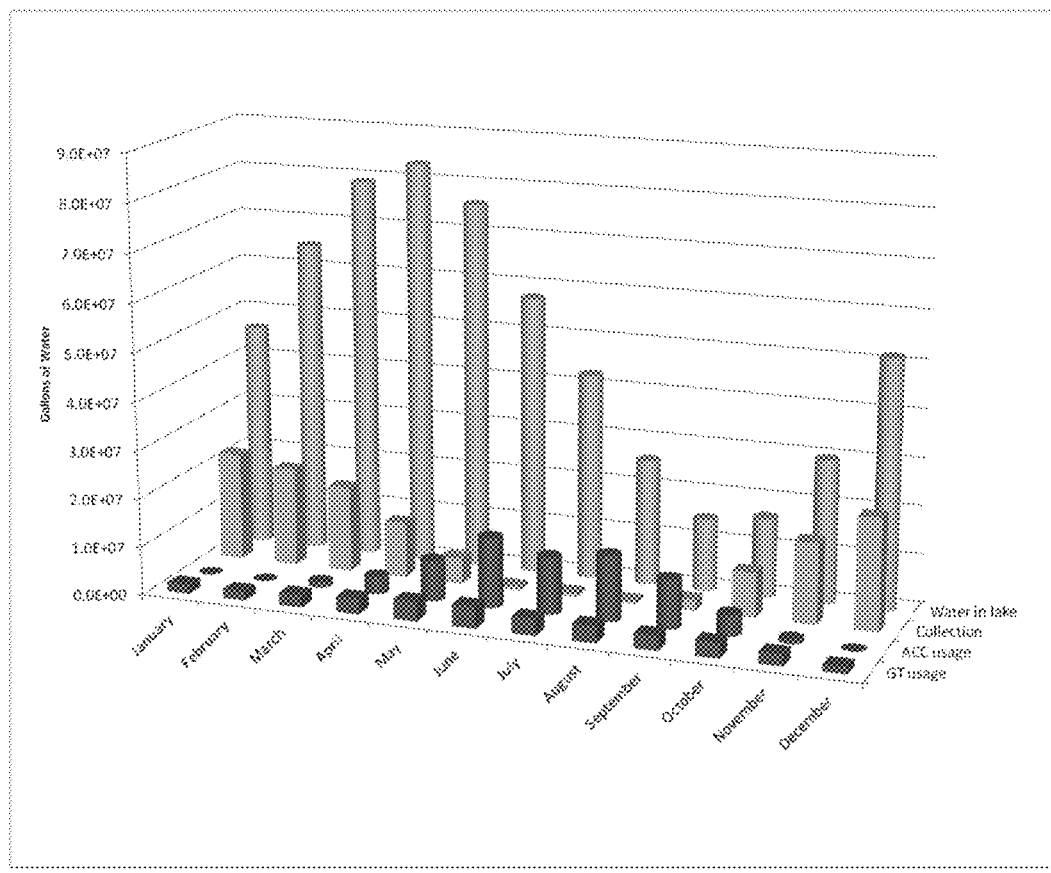
FIG. 14. Monthly water usage in gas turbine, water usage in ACC spraying, water collection, and total amount of water stored in lake.

However, even if there is no water available locally, water is generated by the combustion of Natural Gas (NG) or coal; that water can be collected, stored, and used for cooling when it is needed the most. The present invention provides a process to capture some of this water when the weather is cool and the water is easy to recover, store the water in a lake, and finally use the water to provide extra cooling to the power plant when it is most valuable (in the summer). FIG. 14 illustrates the monthly water collection, storage, and usage by the GT and pre-cooling the air for the ACC (or Heller type dry cooling tower).

Optional embodiments of the invention comprise dry, wet or hybrid wet/dry cooling. While one optional embodiment uses wet cooling, the water does not come from any local water source. While running, the process collects the majority of the water of combustion by condensation or condensation with a desiccant cycle, and use this water to provide cooling to the power cycle. Thus, it provides both a high COP sorption/desorption cooling system and seasonal cool media storage. TDA's desiccant cycle uses the waste heat available in the NGCC exhaust (106° C. cooled to 80° C.) to regenerate the desiccant (for an effective COP=2.0, based on the total water condensed and the heat required to regenerate the desiccant). In one embodiment, the seasonal storage system collects almost all of its water between November and April, and uses most of it between May and October (it does collect small amounts of water on some summer nights, and does use small amounts of water for fog cooling year round).

The invention does not require any expensive vacuum equipment or stainless steel construction and replaces many of the metal components with plastic, which reduces capital cost. By designing the system to run at ambient pressure instead of vacuum this greatly reduce the load on the vessels, which in turn is what allows the substitution of plastic for stainless steel. In addition, the water collected from a NGCC increases from 75 gpm in the WETEX case to approximately 500 gpm for the desiccant cycle. The process does this by first condensing some of the water of combustion, and then drying the flue gas with the desiccant. It then recycles the water captured in the absorption solution to the increase the water content of the flue gas stream entering the condenser. For other optional embodiments of the process, the flue gas is first cooled in a cross flow heat exchanger, then water is condensed via a direct contact condensing column. For the wheel cycle, additional water is then condensed in a rotating wheel heat exchanger. The system can capture water even in a hot desert environment (e.g. Phoenix) by collecting it during cool periods (Winter, Spring, Fall, and nights). It then stores that water in a small lake (688 feet diameter and 30 feet average depth for a 550 MW NGCC).

The benefits of the present process increase as the amount of water collected increases, provided it is collected cost-effectively. Some water can be collected by condensation. By adding a desiccant cycle or a rotating wheel, the present process significantly increases the amount of water that can be collected, and will even collect water when the ambient air is warm (e.g., 29° C.=85° F.). If only condensation is used (no desiccant cycle or rotating wheel heat exchanger), it could not have captured very much water under these conditions. The greater amount of water collected by the system enables the use of fog cooling with the gas turbine year-round (except when the ambient air is less than 55° F. to prevent ice), and also enables a lower steam condenser temperature in summer. The cost to collect water is dependent on the system employed, but should be around ~$0.014/gal-$0.025/gal, comparable to the $0.030/gal cost of new water sources in the Rio Grande valley (Copen 2005).

In another embodiment the water of combustion is used to cool the inlet air of a gas turbine (Fog Cooling). This is an improvement over using the collected water to cool the ambient air used in dry cooling towers or ACC (GEA 2013), by timing the use and restricting it only the peak periods when it is most valuable. The system design eliminates the need for expensive vacuum equipment by always operating all portions of our system at or slightly above ambient pressure. This design allows us to use plastics instead of expensive alloys. The cost of equipment has also been minimized by using direct contact condensers (and absorbers, regenerators for the desiccant cycle), which have much higher specific surface areas and heat transfer coefficients than the shell in tube heat exchangers used in other condensing systems (Levy 2001). However, the dry cooling tower is still an indirect heat exchanger as is the water cooled heat exchanger used for cooling the desiccant exiting the absorber, which transfers the heat of absorption to the dry cooling tower for the desiccant cycle.

In one embodiment the system can capture about 60% of the water of combustion during the cooler months. Because there are a few evenings (<20° C.) even in and around the summer months, one embodiment is collecting water for a slightly more than half the year, and using almost all of it in the four hottest months.

The fundamental concept is to collect the water produced by natural gas combustion and use this water to augment normal dry cooling operations. This is done by condensing the water of combustion, sometimes with the aid of a rotating wheel heat exchanger or a desiccant cycle. The collected water is stored in an artificial lake that is about 700 feet in diameter and 30 feet deep. During colder seasons and times such as fall, winter, spring and at nights, the collected water is sent to the lake. During hot summer months during peak power demand (e.g. AC unit in hot dry climates), water is withdrawn from the lake and used to augment dry cooling by spraying it into the air-fin coolers to provide evaporative cooling. In addition, sufficient water is collected that fog cooling can be used with the gas turbine. The heart of the system is the water collection system, in the form of a condenser only system, a wheel system, or a desiccant system. All of these systems are illustrated in FIG. 3, FIG. 4, and FIG. 5.

Example 1 (A Process Using the TDA System of FIG. 3)

In the dry southwest portion of the USA (e.g., Phoenix) the temperature can exceed 115° F., which can raise the back pressure on a dry cooling system substantially, reducing the power output up to 25% when the power is most needed (mainly for air conditioning). By using water stored in the lake over the previous months, the system reduces the ambient air inlet to the gas turbine and the steam cycle condenser to 85° F. (even with 115° F. dry bulb), maximizing power output even on the hottest days.

In an example we evaluated the impact on the power cycle for a Phoenix, Ariz. site. Note Phoenix has an average temperature of 23.3° C. (74° F.) with a 39° F. dew point, which is much hotter than a baseline case of 15° C. (59° F.) year-round. This 59° F. baseline case is frequently used by U.S. government agencies as a reference point to compare improvement technologies. The site change alone reduces the plant power output by 1.88% on an annual basis compared to the reference 59° F. site.

Figure 20:
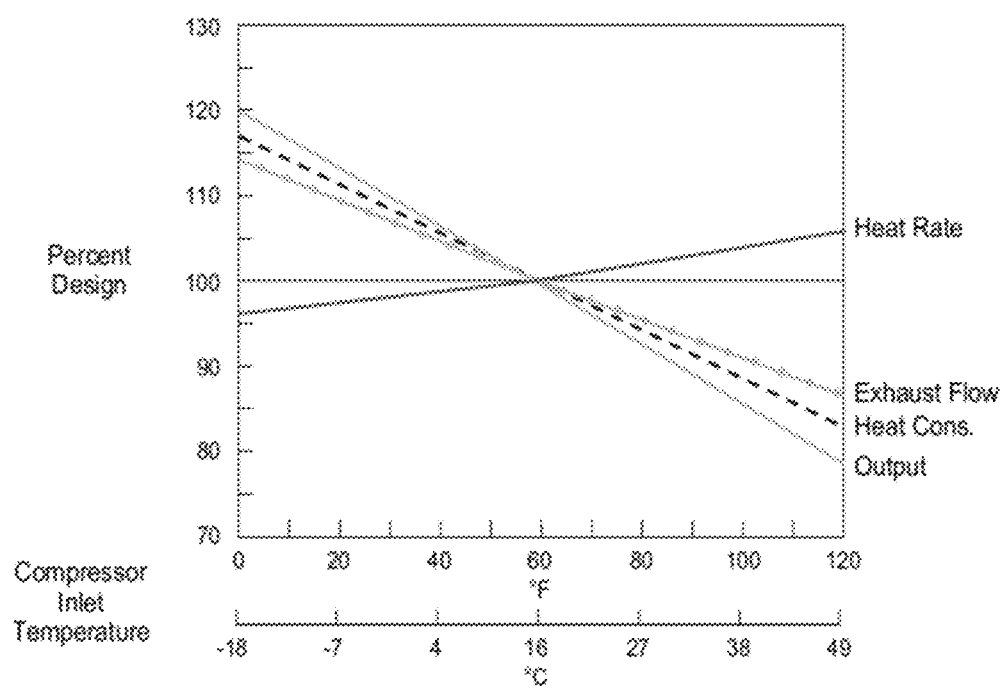
FIG. 20. Effect on ambient temperature on gas turbine performance. (Brooks 2010).

FIG. 1 shows the power losses associated with the TDA system (desiccant based novel cooling system shown in FIG. 3). Thus, the case for the present invention is listed as "TDA in Phoenix Ariz." in FIG. 1. In non-summer months (61.3° F. average dry bulb, 33° F. dew point, 49° F. wet bulb) the present invention still uses fog cooling to lower the inlet air temperature. Thus the gas turbine has the better efficiency and produces more power than dry cooling. In the summer, even with fog cooling, the wet bulb is 80° F. (or less) and the added humidity reduces heat rate; the gas turbine efficiency is reduced (FIG. 21) (Brooks 2010), but by less than the reduced temperature effect (FIG. 20). The overall impact on gas turbine and steam cycle is 1.53% increase in heat rate (annual basis). The heat rate in summer is better than a NGCC with wet or dry cooling (but without Fog cooling). The column listed as "Case 13" is the Department of Energy reference case where the outside temperature is always 59° F., day and night year-round (this is a fictitious case). The column listed as "NGCC with wet cooling" is for a NGCC operating in Phoenix, Ariz. with a wet cooling tower that uses municipal water for cooling. In this hypothetical case the cooling tower would use 8.25 billion gallons of water per year from the local municipality, which is not realistic, but included as a comparison. The column listed as "NGCC with dry cooling" is the same NGCC plant operating in Phoenix, but with a dry cooling tower that requires no water. The column listed as "TDA in Phoenix Ariz." is the same NGCC power plant, but with the TDA system to recover water from the flue gas, a lake for storage and the use of spray cooling a dry cooling tower (spraying water to augment an otherwise air-only cooling tower) and fog cooling the turbine. In practice, only the "NGCC with dry cooling" is practical in Phoenix, as it uses no municipal water. For this case, only 478,377 kWe are generated in the summer, only 86% of the base "case 13". However, this is increased to 90% if water was abundant in Phoenix and the process could use 8.25 billion gallons of water per year. Lastly, the process of the present invention using the TDA system to collect flue gas water and use it for cooling to improve efficiency achieves 98.5% of the base "case 13", without using any municipal water: all of the water for the process of the present invention it collected from the flue gas.

Example 2 (An Example of a Prototype 1 kW Desiccant System.)

Figure 6:
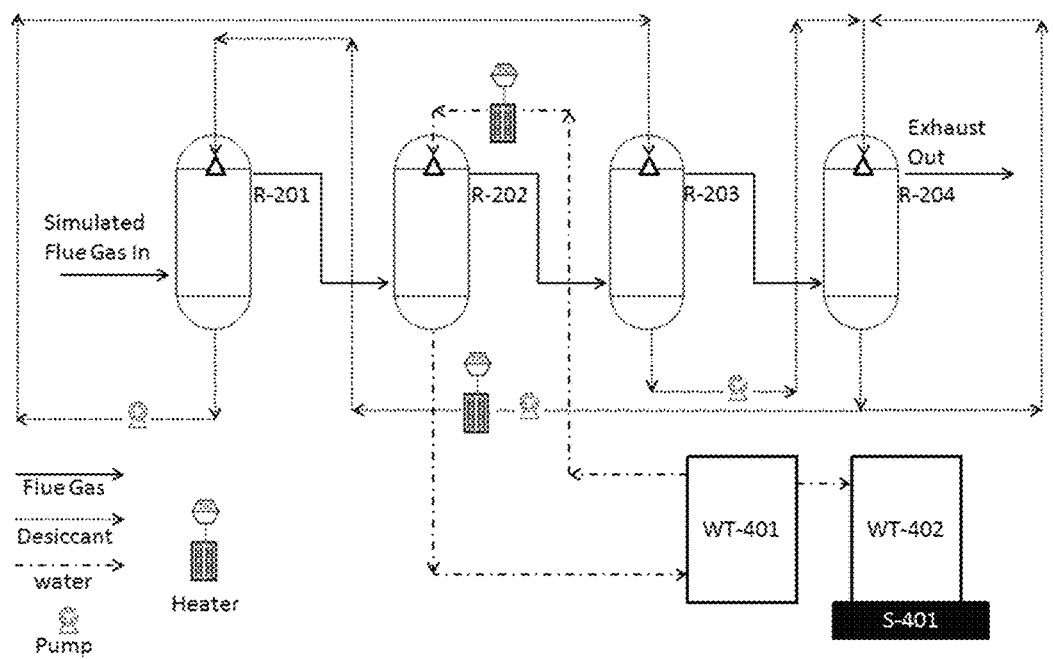
FIG. 6. Schematic 1 kW desiccant cycle.
Figure 7:
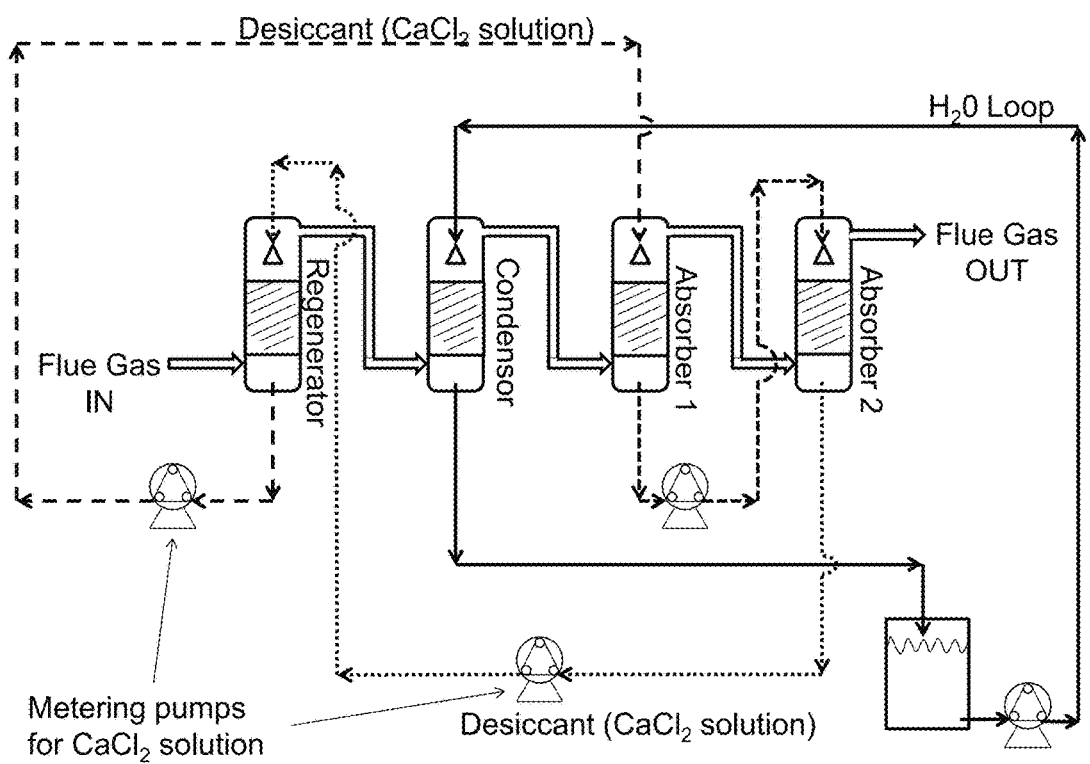
FIG. 7. Photograph of 1 kW test system.
Figure 8:
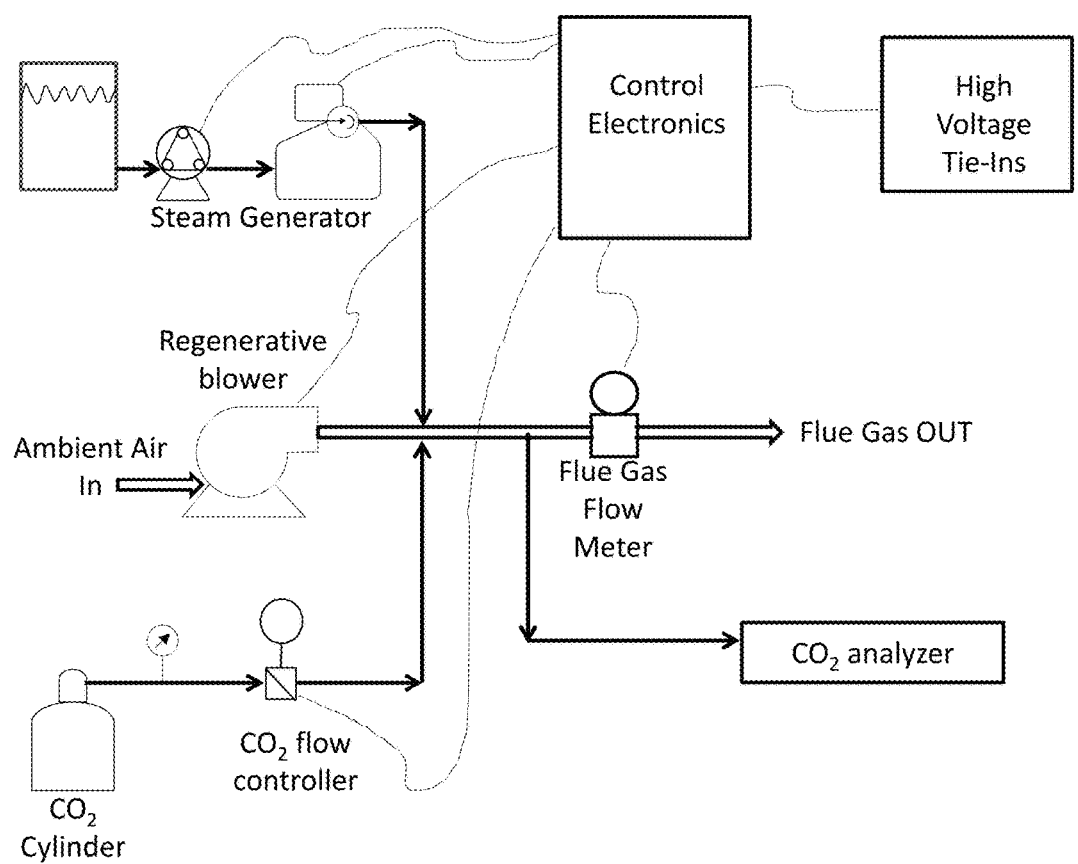
FIG. 8. Detailed photograph of electronic controls box (left) and apparatus for generating simulated flue gas (right).

FIG. 6 is a schematic of a laboratory system. The apparatus has four vessels, each made from 6.75 inch I.D. polycarbonate tubing that are about 4-7 feet tall (one for the regenerator, one for the condenser, and two for the absorber). In order to handle the heat of absorption in the absorber column, and to fit the column within the lab space, the absorber is split into two columns. Strong desiccant is sprayed into the first one. The desiccant exiting from the first column is mixed with recirculating weak desiccant (to lower its temperature) and is sprayed into the second column. The experimental system can be seen in more detail in FIG. 7 and FIG. 8. The flow rate of simulated flue gas (humidified $N_2$ heated to 106° C.) is about 94 lb/hr (~20 SCFM). Using humidified $CO_2+N_2$ is a reasonable stimulant because the molecular weight of the combustion gas is about 27.6 g/mole (combustion gas with air contains about 10% $CO_2$ and 70% $N_2$ ($CH_4+2O_2+7.5N_2=CO_2+2H_2O+7.5N_2$). Due to the high temperature of the inlet flue gas, the gas flow line into the regenerator is made from stainless steel. All other flue gas lines are constructed from low cost PVC piping. The desiccant and water lines are neoprene.

Figure 9:
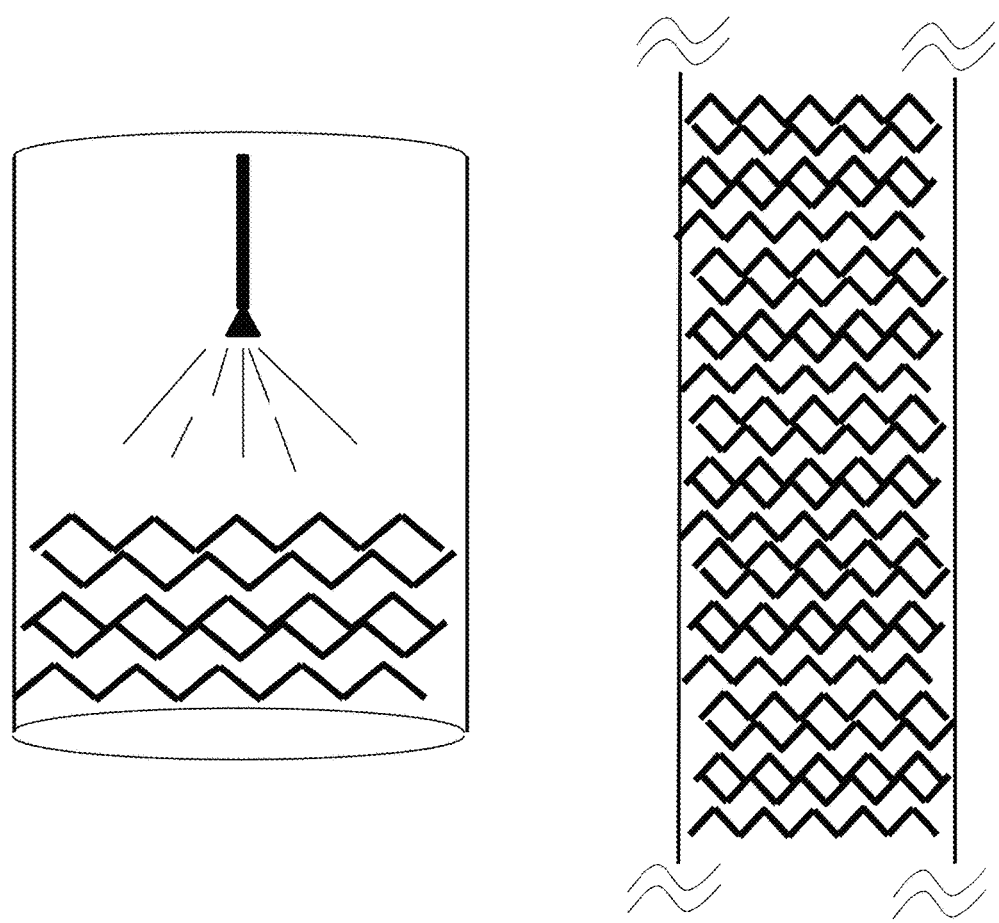
FIG. 9. Detailed photograph showing sprayer (right) and structured packing (left).

The concentration of water in the $CaCl_2$ desiccant solution is such that the $CaCl_2$ solution concentration varies between 37 wt % (weak desiccant) and 38 wt % (strong desiccant). The weak desiccant flow is about 43.5 lb/hr (230 mL/min) and the strong desiccant flow is 40 lb/hr (220 mL/min). The recirculating weak desiccant, which is added to the outlet of the first absorber column, is used at a rate of 120 lb/hr (660 ml/min). The net water collected (from the flue gas) is 3.4 lb/hr (25 mL/min). The reason that the volumes are not additive is that the density of 38 wt % $CaCl_2$ is slightly higher than that of 37 wt % $CaCl_2$ (the masses are additive as required). The recirculation rate of the water to the direct contact condenser is ~70 times that of the collected flow, or 1.7 L/min. There are temperature controlled heat exchangers (cooled by tap water, typically 50° F.) for controlling the water and desiccant temperatures, and laboratory pumps for controlling the flow rates. The collected water is measured using a scale Each of the four vessels have an inside diameter of 6.75 inches. The heights are 4.5', 6.8', 5.6', and 6.2' for the regenerator, condenser, first absorber, and second absorber respectively. All four distribute liquid (water, and strong or weak desiccant solution) using shower head spray distributors. The columns are packed to increase the interfacial area between the desiccant solution and the flue gas to increase the mass transfer rates, and use structured packing to minimize liquid holdup, see FIG. 9.

The entire apparatus is monitored using a process control program (OPTO) with a temperatures and flow rates being measured, controlled and recorded. Several thermocouples are placed in strategic locations in the vessels to measure the temperature changes that accompany desiccation (strong to weak), regeneration (weak to strong) and water condensation. Gas and liquid flows are measured and controlled to obtain accurate material balances. Once experiments for the desiccant cycle are finished, the rig can be repurposed for experiments for the condenser only and/or wheel cycles.

The trouble with a dry cooling system is that its worst performance is usually going to occur during the times of highest consumer power demand. TDA solves this problem by provide extra cooling by evaporation of water recovered from the water of combustion for the power cycle during the times of highest consumer demand. The extra cooling increases the power output of the plant with a dry cooling system. Since the extra power minimizes the amount of expensive peak power (i.e., purchased from another utility or generated with simple cycle combustion turbines), the extra power has a high value, which is equal to the cost of the peak power from other sources.

Figure 15:
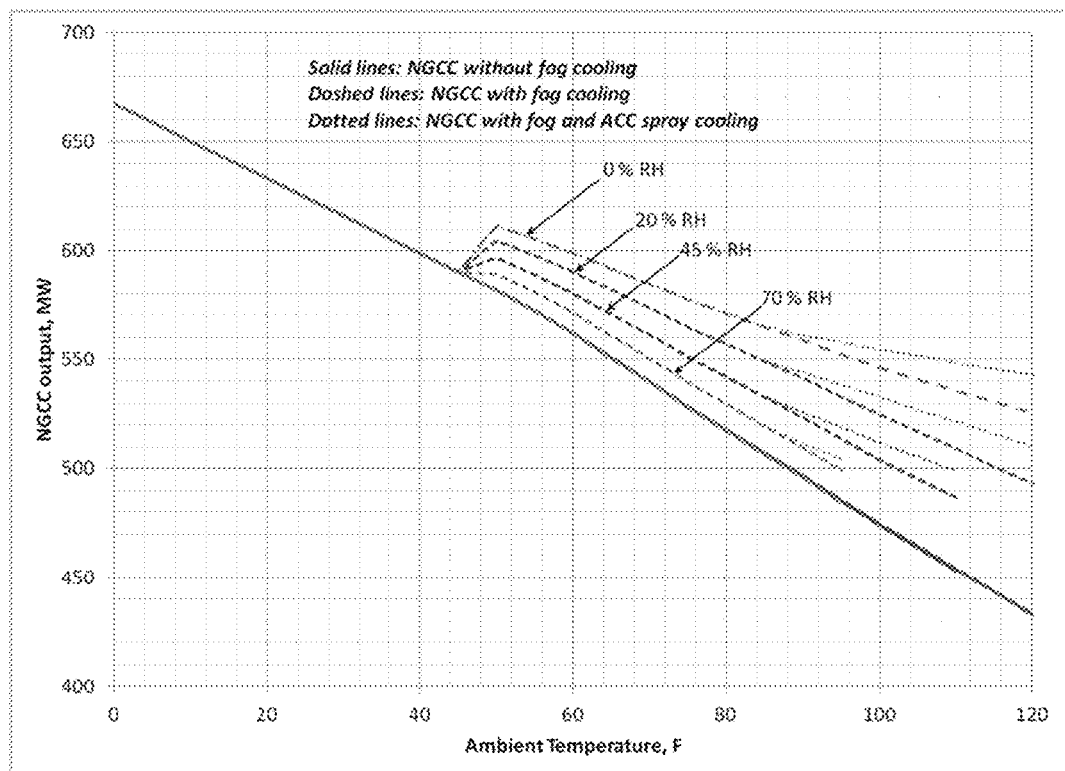
FIG. 15. NGCC output power as a function of temperature and humidity.
Figure 16:
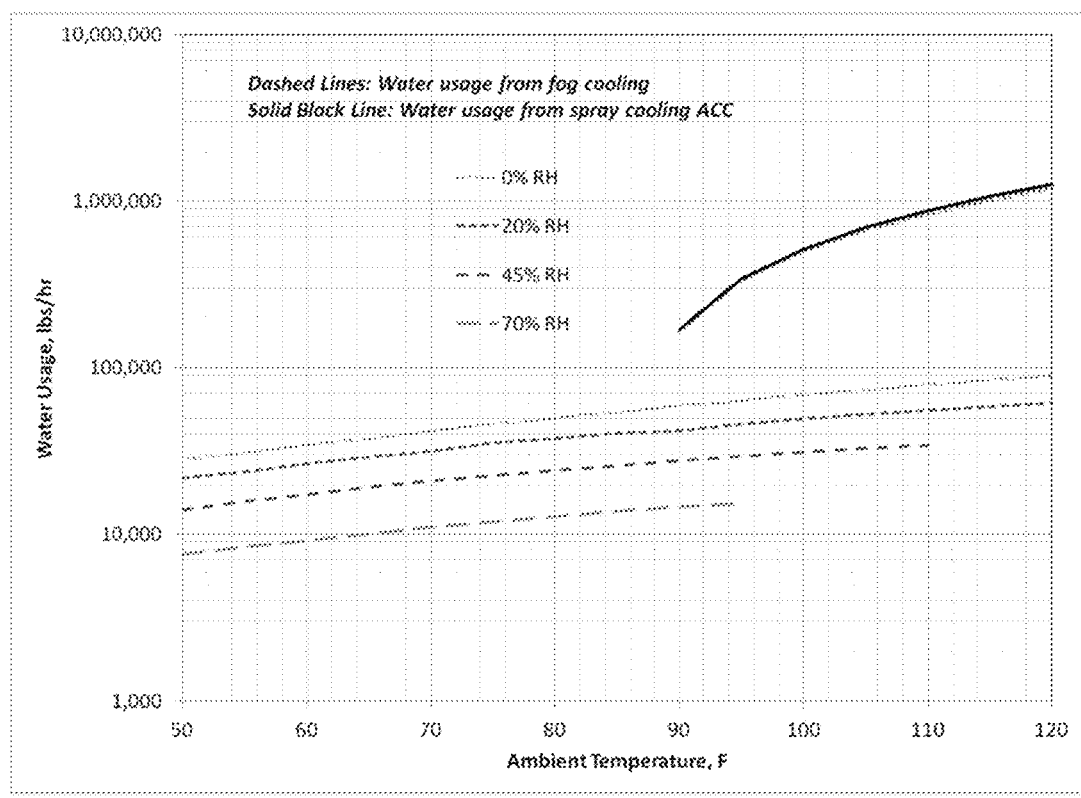
FIG. 16. Water usage for fog cooling as a function of temperature and humidity and ACC spraying as a function of temperature.

This exemplary analysis used data from GE on the de-rating schedule of their gas turbines in order to determine the effect of ambient dry bulb temperature and absolute humidity on output power of the gas turbine part of an NGCC (Brooks 2010). In addition, we used data from NETL case 13 (DOE 2010), and data provided by GEA on the effects of ambient temperature and back pressure in the cooling tower to determine the effects of temperature on the steam cycle (GEA 2013). Combining these sets of calculations allowed us to determine the effect that dry bulb temperature and humidity have on the output of the NGCC. Additionally, we could then calculate the effects of fog cooling, spray cooling the ACC, or using a hybrid wet-dry cooling tower. FIG. 15 shows the output power of a nominal 550 MW NGCC as a function of temperature and relative humidity. We also calculated water collection as a function of temperature and water usage as a function of temperature and humidity (see FIG. 16). For peaking power generated by a simple cycle Gas Turbine we assumed \$128.4/MWh (EIA 2015). Since the NGCC generates power at \$58.9/MWH, we assumed the following electricity rate schedule. In the summer, prices were assumed to be \$128.4/MWh during peak times and \$58.9/MWh during off peak times. In the winter, the price was assumed to be \$83.22/MWh during peak times and \$54.80/MWh during off peak times. Peak times are weekdays, 12:00 PM to 7:00 PM excluding holidays. Monthly temperature data for Phoenix is presented in FIG. 12. Additionally, hourly weather data was collected from the National Oceanic and Atmospheric Administration (NOAA) on an hourly basis over the course of a year for the Phoenix Sky Harbor International Airport. Using the open source programming language, Python, we constructed a simulation to determine water collection, water usage, power production, and value of power produced on an hourly basis for the entire year of 2012. We assumed that water would only be collected if there were at least three consecutive hours below 85° F. (to limit cycling the system). This simulation was used to construct FIG. 14. Based on this simulation, we expect to collect 1,089 million lbs of water per year and to use 868 million lbs of water for fog cooling (294 million lbs) and ACC spraying (574 million lbs). This will allow the NGCC to generate an extra 311,870 MWh of electricity worth \$22.65 million. This simulation does assume electricity rates as high as those reported in (Feely 2001). Had we taken into account rates that can exceed \$250/MWh, the benefit of using the TDA system would be even higher.

We estimated the costs of the three water collection systems. The cost estimates are based on data provided by ARPA-E in their techno-economic analysis (TEA) spreadsheets as well as on data from (Ulrich 1984) and (Kays 1984). Our final estimate for water collection is shown in FIG. 17.

Estimated cost of additional dry cooling tower: To estimate the cost of the dry cooling towers needed for TDA's water collection systems, we used the full scale dry cooling tower included in the ARPA-E TEA as a basis. This is a Heller type cooling tower where the condenser and heat exchanger are expected to cost \$28.3 million and \$23.9 million respectively for a total cost of \$52.2 million. All of the relevant data are given in the ARPA-E TEA spreadsheet for the equation $Q=UA(LMTD)$ where Q is the heat rate, U is the overall heat transfer coefficient, A is the surface area, and LMTD is the log-mean temperature difference. This data is summarized in FIG. 18.

Using the same overall heat transfer coefficient, U, and calculating the LMTD and Q of the water to be cooled based on inlet and exit temperatures and the mass flow rate, allows us to calculate the required heat exchanger surface area, A. This can then be scaled by the full scale heat exchanger surface area and the full scale cooling tower cost to estimate the cost of the cooling towers for the three alternate TDA water collection systems. The results are shown in FIG. 19. As expected, the desiccant system has the highest cost of dry cooling tower (\$11,969,950) because it has the highest heat load because this cooling tower must remove the heat of absorption of water vapor into the $CaCl_2$ desiccant solution. The cooling tower costs for the direct contact condense only and wheel condense systems are substantially lower (~\$4.7 and \$4.1 million respectively) because there is no heat of absorption heat load and because some of the cooling water used in the condensing columns is cooled via the fin-fan heat exchanger and not the dry cooling tower, reducing the heat load further.

Estimated cost of fin-fanned heat exchanger: In order to reduce the amount of water that needs to be cooled via a cooling tower, a fin-fanned heat exchanger (air fin cooler) was added to the condenser only and wheel heat exchanger systems. The overall heat transfer coefficient, U, for finned fan heat exchangers can be found in (Ulrich 1984). Knowing the air and water inlet and exit temperatures and the total amount of heat that must be removed, we can calculate the surface area for heat transfer (A). Graphs displaying the cost of many of our components including fin-fanned heat exchangers as a function of readily available metric in 1982 dollars can be found in (Ulrich 1984). In the case of the fin-fanned heat exchanger, this metric is the exchanger surface area. The cost can be computed in today's dollars and appropriate installation factors applied to estimate the cost of the fin-fanned heat exchangers The Chemical Engineering Plant Cost Index (CEPCI) for 1982 and 2013 is 315 and 567.3 respectively. To scale form 1982 dollars to 2013 dollars (a good proxy for today's dollars), multiply by 567.3/315. For the condense only system and wheel cycle, the fin-fan heat exchangers are expected to cost \$864,457 and \$486,257 respectively. The fin fan heat exchanger is not used in the desiccant cycle so its cost is \$0.

Estimated cost of cross flow heat exchanger: The cost of the cross flow heat exchanger was calculated using a procedure that was similar to that used when sizing the other heat exchangers; we first determine the total amount of heat to be rejected (Q), calculate an overall heat transfer coefficient (U) and LMTD, and from this calculate the required heat exchanger surface area (A). Assuming that the heat exchanger is made from 1 mm thick aluminum sheets, the total material cost can be estimated. The final cost is then estimated by multiplying the material cost by 3.42, which accounts for fabrication and installation. These final costs were $4.4 million for the condense only cross flow heat exchanger, and $3.1 million for the wheel cycle's cross flow heat exchanger.

Estimated cost of wheel heat exchanger: The wheel heat exchanger is added to condense some of the water that is leftover in the flue gas after it exits the direct contact condenser, which makes up for the water not collected due to the removal of the desiccant loop. The two most important factors for the wheel heat exchanger are its heat transfer coefficient and the blower power needed to overcome its pressure drop. Data needed to calculate these parameters can be found in Kays and London, (1984). Using these data and material cost information available online, we estimated the wheel heat exchanger to cost approximately $184,000.

Estimated cost of lake: Based on the simulation for water collection, and water usage (FIG. 14), we know that the lake needs to be able to hold 83.5 million gallons of water. This is equivalent to 413,000 cubic yards of water. According to (Aquahabitat 2015), the cost of building a manmade lake is approximately $2.50/cubic yard. We added an additional $30,000/acre to cover the cost of sealants. Based on this, the cost of the lake can be estimated to be approximately $1.29 million.

Estimated cost of packed towers: The majority of the water will be condensed in the direct contact packed tower condenser. We designed a computer simulation for the packed towers. Based on a 1D coupled heat and mass transfer counter flow operation (Babakhani 2009). This simulation allowed us to estimate that the packed towers would be approximately 2.1 meters tall and have a total cross sectional area footprint of 1,702 m$^2$ (likely broken up into multiple parallel towers) for the condense only and wheel cycle systems. The total packed volume is 3,575 m$^3$. Packings can be bought for as little as $500/m$^3$. If we assume a packing cost of $750/m$^3$, the total cost of packing is $2.68 million with a cost of the packed towers of approximately $2.9 million. This cost is approximately ⅓ the cost of the packed towers required by the desiccant cycle. The total capital cost of the three water collection systems, as well as the annual costs and price per thousand gallons of water collected are summarized in FIG. 17. Here, one can see that the capital costs decrease going from the desiccant cycle, to the condenser only cycle, to the wheel cycle ($23.6 million, $15.3 million, and $13.4 million respectively).

Since the flue gas exhausted from the condenser is cooled via the wheel heat exchanger, the fin-fan heat exchanger can be used to cool a higher portion of the cooling water (reducing the load on the dry cooling tower). Additionally, this allows the cross-flow heat exchanger to have a higher LMTD and thus a lower surface area. So, by adding the wheel heat exchanger, we can use a smaller dry cooling tower and a smaller cross flow heat exchanger. These changes more than makes up for the cost of the wheel heat exchanger.

Figure 11:
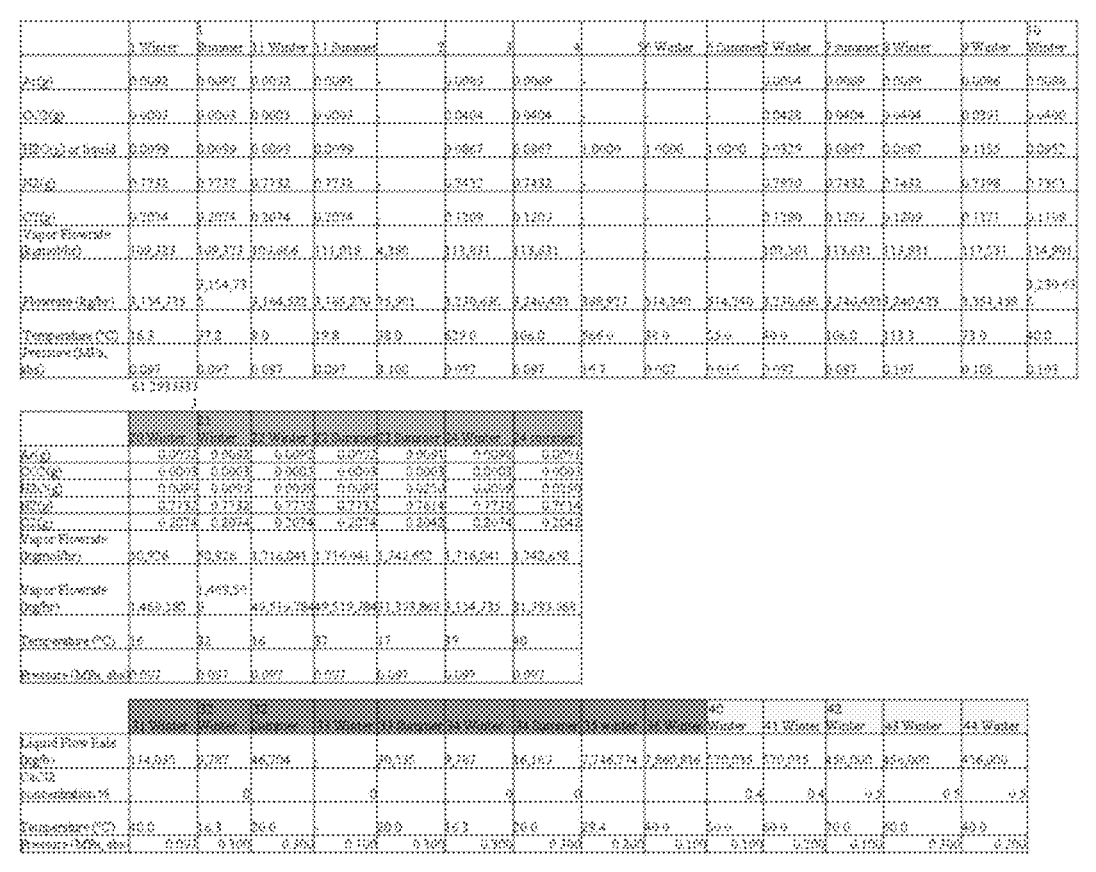

FIG. 11 presents the composition, flow rates, temperatures, and pressures for each state point. Points 1-11 are gas flows in the NGCC and TDA's system. Points 20-25 are cooling air flows in the dry cooling towers. Points 31-35 are water flow rates inside TDA's system Points 40-43 are the CaCl$_2$ solution (desiccant) flows.

Based on the flows in each element and the estimated pressure drop, TDA calculated the power required to operate its equipment. During the summer peak periods only the pumps for the ACC sprayer and fog sprayer are operating and only 266 kW of power is lost. During winter the entire desiccant system is operating and the fog sprayer continues to operate, but not the ACC sprayer. 8,553 kW are needed (see FIG. 10). For condenser only or wheel cycle, parasitic power usage for water collection should be less than for the desiccant cycle since there will be considerably lower pressure drop through the direct contact columns.

Figure 21:
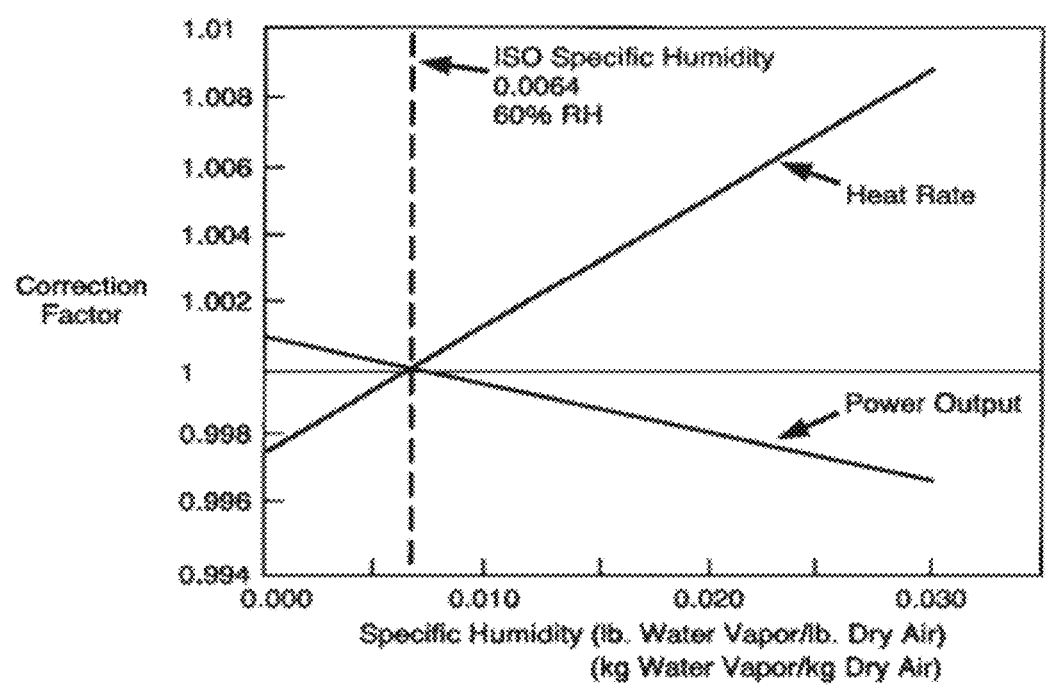
FIG. 21. Effect of humidity on gas turbine performance (Brooks 2010).
Figure 22:
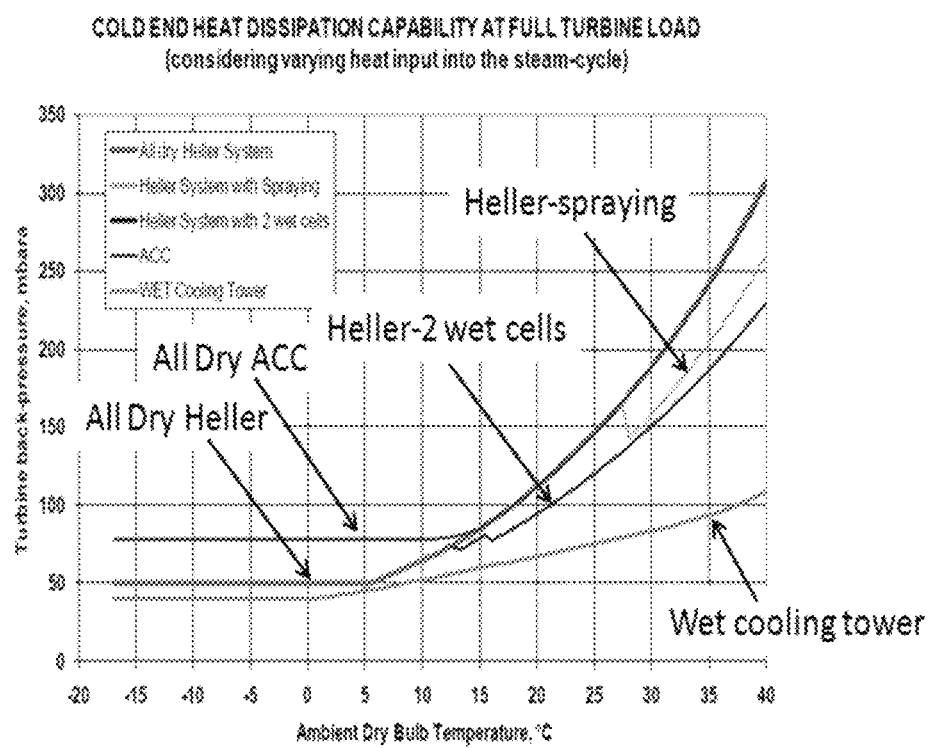
FIG. 22. Effect on condenser back pressure with dry bulb temperature and cooling type (AGG 2013).

FIG. 14 presents the power calculated for both the summer peak period and the winter period. FIG. 20 and FIG. 21 provides the data for effect of temperature and humidity on the gas turbine power and heat rate (Brooks 2010). Those factors were included and we used the efficiency loss for high temperatures in with ACC or Heller dry cooling tower in AGG (2013)(FIG. 22) in the Python simulation and the power calculations below.

For the name plate rating we assumed the winter power generation rate. This over estimates the annual power for the NGCC with Wet Cooling and NGCC with Dry Cooling. For TDA's system the winter rate slightly under estimates the annual power production.

Although not wishing to be bound by the theory, additional embodiments of the invention are as follows: Most of the value from using stored water for cooling comes from "fog" cooling of the Gas Turbine in a NGCC. However, most of the cost of collecting water comes from the desiccant cycle. Since a significant amount of water can be collected with a simple condenser system, the simply condensed water can be used to meet the annual fog cooling requirement (365 days per year of fog cooling). Thus an embodiment is collecting water by only condensation in cool periods and using it for fog cooling of the gas turbine (with no desiccant cycles and no injection of water into the dry cooling tower). This scenario can provide a higher incremental efficiency and revenue gain per unit of investment or unit operating cost.

Other variants of the invention including other embodiments collecting water with only condensation and using this water (instead of for air entering the dry cooling tower) at other sites in the NGCC for fog cooling or for cooling in Combustion Turbines (simple cycle gas turbines) during periods of peak power demand.

By including the desiccant cycle or the wheel cycle, additional water of combustion can be collected during cool periods. The water collected with the desiccant cycle can be used for fog cooling even more NGCC or Combustion Turbines during periods of peak power demand.

Excess water collected by the desiccant cycle could also be sold to local users (e.g. industries) for the cooling needs during periods of low water availability (e.g. drought), which could allow them to keep operating when otherwise they may have to close.

What is claimed is:

1. A seasonal process that captures stores and uses water in an ambient temperature-dependent manner to improve the efficiency of a natural gas power plant, the process comprises:
 (a) providing the natural gas power plant, the natural gas power plant having a flue gas stream, a cooling tower, and a gas turbine;
 (b) providing a water collection system;
 (c) providing a water storage facility;
 wherein the flue gas stream comprises uncondensed water vapor;
 wherein the water collection system is operably connected to the flue gas stream and the flue gas stream is directed to flow, at least in part, into the water collection system;

wherein the water collection system is operably connected to the water storage facility;

wherein the water storage facility is operably connected to the cooling tower and the water storage facility is operably connected to the gas turbine;

wherein the process comprises the following steps of condensing flue gas water or using water that has been condensed from the flue gas stream based on outdoor ambient dry bulb temperature:

(I) condensing water from the flue gas stream to produce a condensed water stream only if the outdoor ambient dry bulb temperature is less than 85° F.;

(II) using condensed water to spray cool the cooling tower only if the outdoor ambient dry bulb temperature is at least 85° F.;

(III) using condensed water to fog cool the gas turbine only if the outdoor ambient dry bulb temperature is at least 55° F.;

wherein condensed water that is not immediately used to cool the cooling tower or to fog cool the gas turbine is stored in the water storage facility; and wherein the process uses a total amount of water, on an annual basis to cool the cooling tower and to fog cool the gas turbine, that does not exceed the annual amount of water condensed from the flue gas stream.

2. The process of claim 1 wherein the cooling tower is a dry cooling tower and condensed water is used to spray cool the dry cooling tower.

3. The process of claim 1 wherein the cooling tower is a wet cooling tower.

4. The process of claim 1 wherein the cooling tower is a hybrid wet-dry cooling tower.

5. The process of claim 2, wherein the water collection system further comprises a three stage desiccant cycle and a calcium chloride desiccant.

6. The process of claim 5 wherein the water collection system recovers at least about 60 wt % of the water from the flue gas.

7. The process of claim 6 wherein the water collection system operates at or above ambient pressure.

8. The process of claim 7 wherein the water collection system further comprises plastic piping or plastic vessels.

9. The process of claim 2, wherein the water collection system further comprises at least one direct contact condensing column.

10. The process of claim 9 wherein the water collection system recovers at least about 60 wt % of the water from the flue gas.

11. The process of claim 10 wherein the water collection system operates at or above ambient pressure.

12. The process of claim 11 wherein the water collection system further comprises plastic piping or plastic vessels.

13. The process of claim 2, wherein the water collection system further comprises at least one direct contact condenser and a rotating wheel heat exchanger.

14. The process of claim 13 wherein the water collection system recovers at least about 60 wt % of the water from the flue gas.

15. The process of claim 14 wherein the water collection system operates at or above ambient pressure.

16. The process of claim 15 wherein the water collection system further comprises plastic piping or plastic vessels.

* * * * *